US009174497B2

(12) United States Patent
Dobashi et al.

(10) Patent No.: US 9,174,497 B2
(45) Date of Patent: Nov. 3, 2015

(54) PNEUMATIC TIRE WITH TREAD HAVING CHAMFERED CIRCUMFERENTIAL GROOVE PORTION OF BENT AUXILIARY GROOVE

(75) Inventors: Kensuke Dobashi, Kodaira (JP); Takaaki Kojima, Kodaira (JP); Shungo Fujita, Kunitachi (JP); Shu Nagai, Sayama (JP); Soutarou Iwabuchi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 859 days.

(21) Appl. No.: 12/600,127

(22) PCT Filed: May 9, 2008

(86) PCT No.: PCT/JP2008/058671
§ 371 (c)(1),
(2), (4) Date: Nov. 13, 2009

(87) PCT Pub. No.: WO2008/143034
PCT Pub. Date: Nov. 27, 2008

(65) Prior Publication Data
US 2010/0206445 A1    Aug. 19, 2010

(30) Foreign Application Priority Data

May 14, 2007  (JP) .................................. 2007-127895
Dec. 5, 2007  (JP) .................................. 2007-315116

(51) Int. Cl.
*B60C 11/03*    (2006.01)
*B60C 11/12*    (2006.01)
*B60C 11/13*    (2006.01)

(52) U.S. Cl.
CPC ............. *B60C 11/13* (2013.01); *B60C 11/0304* (2013.04); *B60C 11/0318* (2013.04);
(Continued)

(58) Field of Classification Search
CPC ................... B60C 11/0304; B60C 2011/0381; B60C 11/1392; B60C 11/1323; B60C 2011/0383; B60C 2011/1209
USPC ......................... 152/209.15, 209.18, 209.22
See application file for complete search history.

(56) References Cited

U.S. PATENT DOCUMENTS 6,123,130 A * 9/2000 Himuro et al. ........... 152/DIG. 3
6,514,366 B1 * 2/2003 Xie ............................ 156/110.1
(Continued)

FOREIGN PATENT DOCUMENTS

EP   1 106 395 A2   6/2001
EP   2 011 671 A1   1/2009
(Continued)

OTHER PUBLICATIONS

Machine translation for Japan 2003-159911 (no date).*
(Continued)

*Primary Examiner* — Steven D Maki
(74) *Attorney, Agent, or Firm* — Sughrue Mion, PLLC

(57) ABSTRACT

A pneumatic tire comprises a tread provided with at least two circumferential main grooves and a rib defined in a tread central portion by the circumferential main grooves, wherein an auxiliary groove is formed in the tread central portion, the auxiliary groove having a circumferential groove portion extending in a tire equator direction and an axial groove portion extending from an end of the circumferential groove portion in such a manner that the axial groove portion is bent at an acute angle to the circumferential groove portion, and at least an end of the auxiliary groove is open into the circumferential main groove.

8 Claims, 7 Drawing Sheets

(52) U.S. Cl.
CPC ......... *B60C11/1392* (2013.04); *B60C 11/1323* (2013.04); *B60C 2011/0381* (2013.04); *B60C 2011/0383* (2013.04); *B60C 2011/1209* (2013.04)

(56) References Cited

U.S. PATENT DOCUMENTS

| | | | |
|---|---|---|---|
| 8,267,132 B2 * | 9/2012 | Dobashi et al. | 152/209.18 |
| 2001/0035245 A1 * | 11/2001 | Ikeda | 152/209.28 |
| 2007/0051448 A1 * | 3/2007 | Yumii | 152/209.18 |
| 2012/0067479 A1 * | 3/2012 | Waki et al. | 152/209.18 |

FOREIGN PATENT DOCUMENTS

| | | | | |
|---|---|---|---|---|
| JP | 02-179508 | A | * | 7/1990 |
| JP | 06-191226 | A | * | 7/1994 |
| JP | 7-76203 | A | | 3/1995 |
| JP | 07-076203 | A | * | 3/1995 |
| JP | 09-071106 | A | * | 3/1997 |
| JP | 09-226323 | A | * | 9/1997 |
| JP | 09-323511 | A | * | 12/1999 |
| JP | 2000-118207 | A | * | 4/2000 |
| JP | 1137617 | | | 4/2002 |
| JP | 2003-146018 | A | | 5/2003 |
| JP | 2003-159911 | A | | 6/2003 |
| JP | 2003-159911 | A | * | 6/2003 |
| JP | 2003-211921 | A | | 7/2003 |
| JP | 2003-211921 | A | * | 7/2003 |
| JP | 2004-523422 | A | | 8/2004 |
| JP | 2005-022530 | A | | 1/2005 |
| JP | 2005-161921 | A | * | 6/2005 |
| JP | 2005-161921 | A | | 6/2005 |
| JP | 2006-001312 | A | | 1/2006 |
| JP | 2006-001312 | A | * | 1/2006 |
| JP | 2006-76349 | A | | 3/2006 |
| JP | 2007-055333 | A | * | 3/2007 |
| JP | 2007-112218 | A | | 5/2007 |
| JP | 2007-237816 | A | | 9/2007 |
| JP | 2007-237816 | A | * | 9/2007 |
| WO | 2004-103737 | A1 | | 12/2004 |

OTHER PUBLICATIONS

Machine translation for Japan 2005-161921 (no date).*
Machine translation for Japan 2007-237816 (no date).*
Machine translation for Japan 2006-001312 (no date).*
Machine translation for Japan 07-076203 (no date).*
Machine translation for Japan 2003-211921 (no date).*
Machine translation for Japan 2000-118207 (no date).*
Machine translation for Japan 09-226323 (no date).*
Translation for Japan 02-179508 (no date).*
Machine translation for Japan 06-191226 (no date).*
Machine translation for Japan 09-071106 (no date).*
Machine translation for JP 2007-055333 (no date).*
Machine translation for Japan 09-323511 (no date).*
Extended European Search Report issued in European Application No. 11184140.9 dated Dec. 1, 2011.
Korean Office Action issued in Korean Application No. 10-2011-7028011 dated Jan. 10, 2012 with translation.
Korean Office Action issued in Korean Application No. 10-2009-7025871, dated Jun. 21, 2011.
International Search Report of PCT/JP2008/058671 dated Jul. 15, 2008.
Submission of Relevant Documents filed in Japanese Application No. 2009-515154 dated Jun. 16, 2011.
Chinese Office Action issued in Chinese Application 200880023348.5 dated Apr. 21, 2011.
Extended European Search Report issued in European Application No. 08752554.9-2425 / 2154008 dated Apr. 13, 2011 (6 pages).
Korean Office Action dated Aug. 24, 2012 in corresponding Patent Application No. 10-2011-7028011.
Japanese Office Action dated Sep. 25, 2012 in corresponding Patent Application No. 2009-515154.
European Office Action dated Feb. 12, 2013 issued in EP Patent Application No. 11184140.9-1760.
Chinese Office Action issued in Chinese Patent Application No. 201110308297.4 dated Sep. 26, 2013.

* cited by examiner (a)

tread central portion (b)

PNEUMATIC TIRE WITH TREAD HAVING CHAMFERED CIRCUMFERENTIAL GROOVE PORTION OF BENT AUXILIARY GROOVE

TECHNICAL FIELD

The present invention relates to a pneumatic tire reducing a columnar resonance due to a circumferential main groove formed in a tread pattern of the tire.

RELATED ART

As the ratio of tire noise occupied in automobile noise becomes relatively large accompanied with further improvement of the silence in recent vehicles, the reduction of such a tire noise is a significant matter. Particularly, the tire noise at about 1000 Hz easily hearing with the human ears becomes a main factor of the off-vehicle noise and the prompt countermeasures with respect to this noise are also demanded from a viewpoint of the environmental problems.

It is generally known that tire noise at a frequency range of approximately 800 to 1400 Hz is generated by a so-called columnar resonance, which is resulted from resonance in an air column defined between a circumferential groove formed in the tread and a road surface in the ground contact face of the tire.

In a state that a tire having a circumferential main groove contacts a ground, a tube having the same length as the ground contact length is formed between a groove wall of the circumferential main groove and the ground contact face. As a result that compression and release of air in this pipe are repeated with running of the tire, noise called a columnar resonance is generated. A frequency $f_0$ of this columnar resonance is a constant frequency represented by $$f_0 = v/2L$$

where a sonic speed is v and a length of the tube, that is, a length of a circumferential groove is L.

In order to suppress such a columnar resonance, WO2004/103737 discloses a tread pattern capable of restraining reduction of wet performance, maintaining driving stability and reducing a columnar resonance of a tire, in which a tread 1 is provided with two or more circumferential main grooves 2, 3 extending in a linear or zigzag form in the circumferential direction and a plurality of axial auxiliary grooves 5 formed to at least one circumferential main groove (circumferential main groove 2 in FIG. 7), wherein one end of the axial auxiliary grooves 5 is open into the circumferential main groove and the other terminates in the land portion and more than one axial auxiliary groove 5 is always completely included in a ground contact face as shown in FIG. 7.

By providing the auxiliary grooves branching from the circumferential main groove in this way, the frequency of a columnar resonance can be dispersed. When the frequency is dispersed, one feels that an easily hearing sound is softened and there becomes silence. This effect is called change to white noise.

The dispersion effect of a frequency depends on a shape of the auxiliary groove. Specifically a frequency f of sound dispersed and newly generated is represented by $$f = (2n-1) \times v/4l$$

n: oscillation degree (n=1, 3, 5...)
where a length of the auxiliary groove is l and a sonic speed is v.

DISCLOSURE OF THE INVENTION

In a pneumatic tire described in WO2004/103737 the axial auxiliary groove continued into the circumferential main groove can disperse the frequency of a columnar resonance generated in the circumferential main groove and change it to white noise. However, there is still the following problem in order to enhance the effect of this technique.

In a pneumatic tire described in WO2004/103737 a rib 12 between the circumferential main grooves 2, 3 is divided by the auxiliary groove 5 as shown in FIG. 7 since the auxiliary groove 5 has a certain degree of length. With this, the portion of the rib 12 sandwiched between the auxiliary groove 5 and the circumferential main groove 3 extremely reduces its stiffness so that driving stability is deteriorated. Therefore, there is a problem that enough number of auxiliary grooves contributing to sound absorption cannot be provided.

It has been found that enough length of the auxiliary groove can be secured and reduction in noise level can be achieved without reduction of stiffness of the rib by making up the auxiliary groove of an axial groove portion open into the circumferential main groove and a circumferential groove portion and by folding this axial groove portion at an acute angle with respect to the circumferential groove portion.

That is to say, the circumferential distance of the auxiliary groove 5 folded at an acute angle with respect to the circumferential groove portion as shown in FIG. 8a in comparison to that of the auxiliary groove 5 having the same length of the circumferential groove portion folded at an obtuse angle as shown in FIG. 8b is found to be short. Therefore, even in a tire having a small tire size (outer diameter), an auxiliary groove folded at an acute angle is connected to a circumferential groove is provided so that a columnar resonance can be reduced.

In addition, it has been found that a circumferential groove provided in a tread central portion easily traps a stone. This is because an axial groove is deformed due to stepping-in and kicking-out deformation to be opened but a circumferential groove is not opened in the absence of such deformation. When an auxiliary groove is provided in a tread central portion, especially the land portions sandwiching a circumferential groove portion reduce their stiffness, which causes a problem that stone trapping is easily generated in the grooves. In other words, a portion having locally low stiffness, for example, the top portion where the tread contact surface contacts the groove wall of the auxiliary groove traps a stone to be deformed and absorbs tire deformation due to stepping-in and kicking-out so that a stone is easily left in the auxiliary groove. It has been found that a stone is easily left especially in the portion where the auxiliary groove is bent at an acute angle.

A columnar resonance arises from compressed air in the circumferential main groove which is liken to an air column as mentioned above and this columnar resonance symptom is easily generated in the circumferential main groove in the tread central portion. The inventors have found it preferable to provide the above-mentioned auxiliary groove branching from the circumferential main groove in the tread central portion, especially in the rib including the tire equator in order to reduce a columnar resonance in the circumferential main groove in the tread central portion. In addition, in case that the auxiliary groove is provided in a tread side, driving stability may be deteriorated and uneven wear may be generated. Also based on such viewpoint, it is preferable to provide the auxiliary groove in tread central portion.

When the tread is provided with a plurality of circumferential main grooves, the tread is sectioned into tread sides and a tread central portion. The tread central portion as used herein means a region between a circumferential main groove adjacent to one tread edge of the tread and a circumferential main groove adjacent to the other tread edge. In addition, a center rib described below means a rib including the tire equator.

It is, therefore, an object of the present invention to solve the above-mentioned problems and to provide a pneumatic tire capable of reducing a columnar resonance generated in the circumferential main groove and improving drainage performance without sacrificing excellent driving stability.

In addition, it is another object of the present invention to provide a pneumatic tire improving stone trapping resistance.

The subject matter of the present invention is as follows.

(1) A pneumatic tire comprising a tread provided with at least two circumferential main grooves and a rib defined in a tread central portion by the circumferential main grooves, wherein an auxiliary groove is formed in the tread central portion, the auxiliary groove having a circumferential groove portion extending in a tire equator direction and an axial groove portion extending from an end of the circumferential groove portion in such a manner that the axial groove portion is bent at an acute angle to the circumferential groove portion, and at least an end of the auxiliary groove is open into the circumferential main groove.

(2) The pneumatic tire according to the above (1), wherein the circumferential main grooves form a pair across the tire equator.

(3) The pneumatic tire according to the above (1) or (2), wherein the circumferential groove portion of the auxiliary groove has a chamfered portion inclined with respect to a surface of the tread on at least one groove wall of both groove walls sectioning the circumferential groove portion.

(4) The pneumatic tire according to the above (3), wherein the chamfered portion is formed on one groove wall of the circumferential groove portion in a side of the axial groove portion.

(5) The pneumatic tire according to the above (3) or (4), wherein the chamfered portion formed on one groove wall of the circumferential groove portion of the auxiliary groove has an inclination angle within a range between 20 degrees and 60 degrees with respect to the surface of the tread.

(6) The pneumatic tire according to any one of the above (3) to (5), wherein the chamfered portion is formed on one groove wall of the circumferential groove portion in a side of the axial groove portion and has a depth of 10% to 60% of that of the circumferential groove portion.

(7) The pneumatic tire according to any one of the above (1) to (6), wherein a length of the circumferential groove portion of the auxiliary groove measured along its longitudinal direction is longer than that of the axial groove portion of the auxiliary groove measured along its longitudinal direction and an entire length of the auxiliary groove obtained by adding the length of the circumferential groove portion and the length of the axial groove portion is within a range of 40% to 60% of a ground contact length of the tread.

(8) The pneumatic tire according to any one of the above (1) to (7), wherein a depth of the circumferential groove portion of the auxiliary groove is smaller than that of the axial groove portion of the auxiliary groove.

(9) The pneumatic tire according to any one of the above (1) to (8), wherein a depth of the axial groove portion of the auxiliary groove at a region adjacent to an opening into the circumferential main groove is smaller than that of the axial groove portion at a region other than the adjacent region.

According to the present invention, it is possible to provide a pneumatic tire capable of reducing a columnar resonance generated in the circumferential main groove and improving drainage performance without sacrificing excellent driving stability by providing the auxiliary groove in the tread central portion in such a manner that the auxiliary groove has at least one end open into the circumferential main groove and is bent at an acute angle. In addition, it is possible to provide a pneumatic tire capable of restraining stone strapping generated by forming the auxiliary groove in the tread central portion by providing the auxiliary groove with a chamfered portion.

BRIEF DESCRIPTION OF THE DRAWINGS

FIG. 1a is a development view of a tread pattern typically showing an embodiment of a pneumatic tire of the present invention, FIG. 1b is a sectional view taken along line A-A in FIG. 1a and FIG. 1c is a partial enlarged view of FIG. 1a.

FIG. 2a shows a development view of a tread pattern of an example tire of the present invention and FIG. 2b shows a sectional view taken along line B-B in FIG. 2a.

FIG. 5a shows a development view of a tread pattern of Example tire E of the present invention and FIG. 5b shows a sectional view taken along line C-C in FIG. 5a.

FIG. 6a shows a development view of a tread pattern of Example tire F of the present invention and FIG. 6b shows a sectional view taken along line D-D in FIG. 6a.

Figure 1:
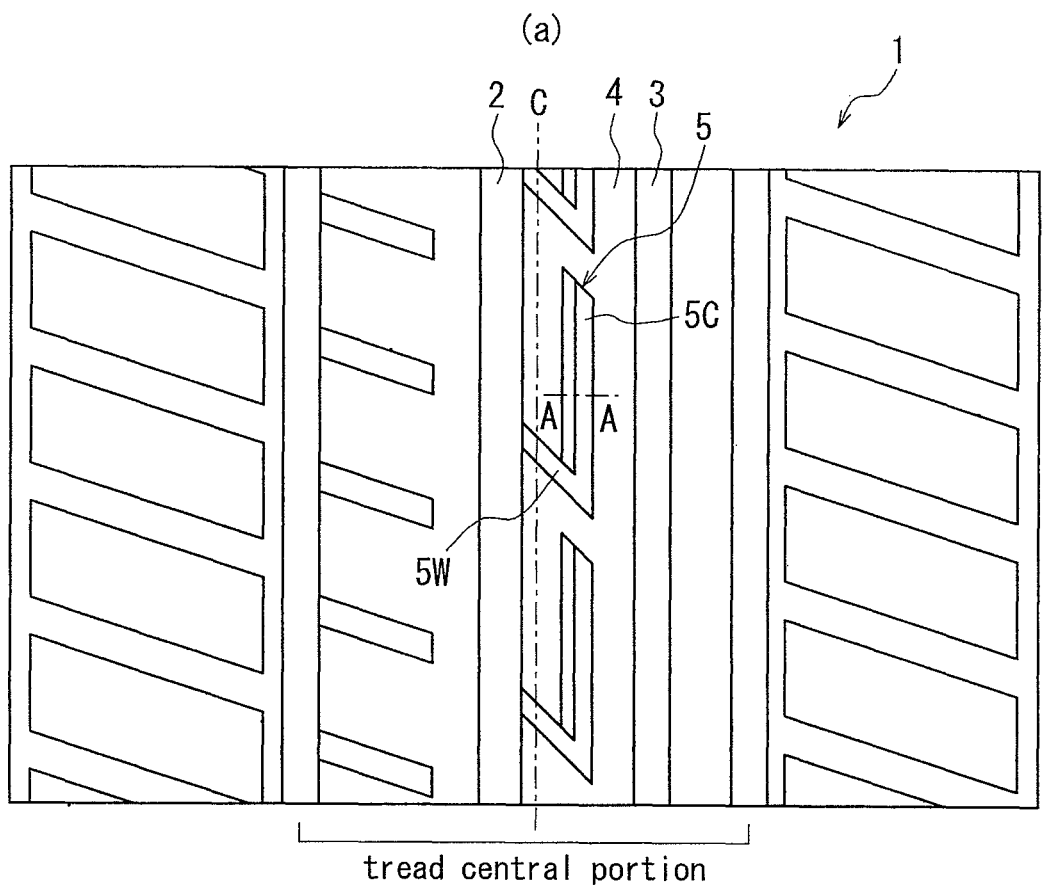
Figure 1:
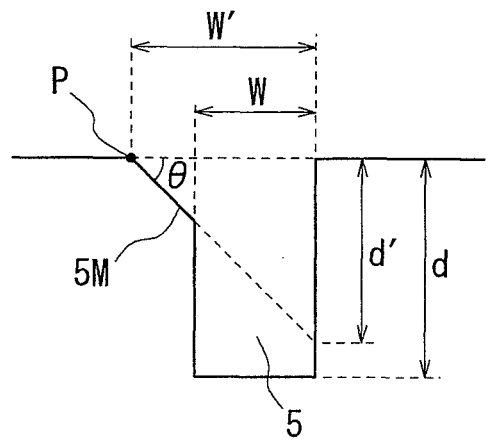
Figure 1:
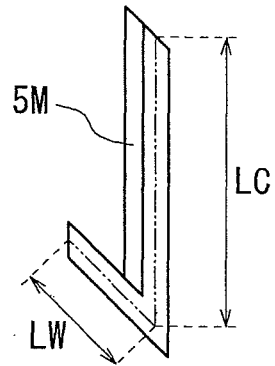

DESCRIPTION OF REFERENCE NUMERALS 1 tread
2,3,6 circumferential main groove
4 center rib
5,7,8,9,10 auxiliary groove
12 rib
15A,15B sipe
5C circumferential groove portion
5W,5W$_1$,5W$_2$ axial groove portion
5M chamfered portion
C tire equator
P opening edge

BEST MODE FOR CARRYING OUT THE INVENTION

Hereinafter, embodiments of a pneumatic tire according to the present invention will be described in detail with reference to the drawings.

In addition, internal reinforcement structures and the like of this tire is not described since they are similar to those of a general radial tire.

FIG. 1a is a development view of a tread pattern typically showing an embodiment of a pneumatic tire of the present invention, FIG. 1b is a sectional view taken along line A-A line in FIG. 1a and FIG. 1c is a partial enlarged view of FIG. 1a.

As shown in FIG. 1a, a tread 1 of a tire is provided with two circumferential main grooves 2, 3, which form a pair across a tire equator C and extend along the tire equator C and a center rib 4 between the circumferential main grooves 2, 3. In addition, this center rib 4 is provided with auxiliary grooves 5. Each of these auxiliary grooves 5 has a circumferential groove portion 5C extending along the tire equator C and an axial groove portion 5W extending from an end of the circumferential groove portion 5C towards the circumferential main groove 2, which is formed adjacent to the tire equator C among two circumferential main grooves 2, 3 and open into this circumferential main groove 2.

By communicating the auxiliary groove 5 with the circumferential main groove 2 in this way, the frequency of a columnar resonance generated in the circumferential main groove can be dispersed as stated above.

In view of drainage performance in addition to sound absorption effect, the tread is preferably provided with a lot of grooves having a certain degree of length. Thus, by forming the auxiliary groove to be bent at an acute angle, it is possible to form a lot of grooves while assuring stiffness of the rib without dividing the rib.

It is preferable to provide grooves particularly in the center rib 4, wherein ground contact pressure is high so that drainage performance and calm characteristics can be improved by providing the above-mentioned auxiliary groove 5.

As stated above, the present invention has the advantage of keeping good driving stability, dispersing the frequency of a columnar resonance generated in the circumferential main groove and improving drainage performance by providing the auxiliary grooves 5 in the tread central portion, especially in the center rib 4.

From a viewpoint of the auxiliary groove itself, the whole auxiliary groove has to contact the ground in order to absorb a reflected sound wave. Also in this point, the whole auxiliary groove should be folded at an acute angle easily to contact the ground. Therefore, particularly a tire having a wide contact width and low oblateness preferably has a folded auxiliary groove.

Although FIG. 1a shows an example that the auxiliary groove 5 is open into the circumferential main groove 2, the auxiliary groove 5 may be open into the circumferential main groove 3. From a viewpoint of dispersion effect of a columnar resonance, the auxiliary grooves 5 are preferably provided to as many circumferential main grooves as possible.

It is important that, as shown in FIG. 1b, the circumferential groove portion 5C of the auxiliary groove 5 has a tapered chamfered portion 5M inclined with respect to the surface of the tread 1 on its groove wall. Although FIG. 1b shows an example that the chamfered portion 5M is provided on the groove wall in the side of the tire equator C, the chamfered portion 5M provided on the groove wall in the opposite side of the tire equator C can exert the similar effect. In particular, it is preferable to provide the chamfered portion on the groove wall in the side wall of tire equator C because the ground contact pressure is high in the tire equator C and stone trapping is easily generated.

The inclination angle θ is an angle formed by a line segment which is parallel to the tire axis and passing through an opening edge P of the circumferential groove portion 5C of the auxiliary groove 5 and the chamfered portion 5M of the circumferential groove portion 5C.

When the auxiliary groove 5 is provided in the center rib 4 of the tread 1 of the tire, particularly the land portions on the both sides of the circumferential groove portion 5C reduce their stiffness so that the circumferential groove portion 5C traps a stone. A portion having locally low stiffness, for example, the top portion where the tread contact surface contacts the groove wall traps a stone to be deformed and absorbs tire deformation due to stepping-in and kicking-out so that a stone is easily left in the groove. Therefore, by providing the chamfered portion 5M in the circumferential groove portion 5C, it is possible to cut off a portion of locally low stiffness and to improve stone strapping resistance.

In addition, by providing the chamfered portion 5M in the circumferential groove portion 5C, the volume of the auxiliary groove is increased due to the increase of the section area of the auxiliary groove 5 and the frequency dispersion effect is enhanced, which results in reduction of a columnar resonance as well as improvement of drainage performance. By providing the chamfered portion 5M in the circumferential groove portion 5C, driving stability may be deteriorated since the ground contact area of the tread is decreased. However, since a part of low stiffness is cut off and the area cut off is small, it is thought to have a negligible influence on driving stability.

The effect of the present invention can be achieved by providing this chamfered portion in the auxiliary groove which is bent at an acute angle and terminates in the land portion. The effect of the present invention can be also achieved by providing the chamfered portion in the circumferential groove portion of the auxiliary groove which is bent more than three times although not shown.

The axial direction as used herein means substantially perpendicular to the circumferential main groove and has a range of 30 degrees to 90 degrees with respect to the circumferential main groove. In addition, the circumferential direction has a range of 0 degree to 20 degrees with respect to the circumferential main groove. The circumferential groove portion does not have to have the angle of the above-mentioned range across its entire length with respect to the circumferential main groove and may be curved a little as described below. It is important to form an acute angle by the circumferential groove portion and the axial groove portion which respectively have an angle of the above-mentioned range.

In addition, the inclination angle θ is preferably within a range of 20 degrees to 60 degrees. When the angle is less than 20 degrees, a stone trapping improvement effect is small. On the other hand, when the angle is more than 60 degrees, the land portion is greatly cut off to reduce stiffness of the rib so that driving stability is degraded.

As shown in FIG. 1c, the length LC of the circumferential groove portion 5C measured along its longitudinal direction is longer than the length LW of the axial groove portion 5W measured along its longitudinal direction. The reason is as follows. In order to achieve dispersion of a columnar resonance sufficiently, the entire length of the auxiliary groove should have a certain degree of length. However, since the rib having the auxiliary groove is thin, the circumferential groove portion 5C has to be lengthened.

In FIG. 1c the length LC of the circumferential groove portion 5C measured along its longitudinal direction is a length of a line segment passing through the center of the groove width W of the circumferential groove portion 5C, in which the chamfered portion is not included and the length LW of the axial groove portion 5W measured along its longitudinal direction is a length of a line segment passing through the center of the axial groove portion 5W.

In addition, the entire length (LC+LW) of the auxiliary groove 5 obtained by adding the length LC of the circumferential groove portion 5C measured in its longitudinal direction and the length LW of the axial groove portion 5W measured in its longitudinal direction is preferably within a range of 40% to 60% of a ground contact length of the tread.

This is because the inventors have studied to know that the frequency of a columnar resonance is well dispersed when the entire length of the auxiliary groove 5 is about half of the ground contact length of the tread.

Next, a configuration further to improve stiffness of the tread 1 will be explained.

The tread is easily deformed in the tire axial direction more than in the tire circumferential direction. In addition, when a groove is formed in the tread, the deeper the groove is, the lower stiffness of the tread is. Therefore, the depth of the circumferential groove portion 5C is preferably smaller than that of the axial groove portion 5W. With this, it is possible to increase stiffness of the land portion around the auxiliary groove and to obtain driving stability.

It is preferable for the axial groove portion 5W of the auxiliary groove that the depth of the axial groove portion 5W at a region adjacent to an opening into the circumferential main groove 2 is smaller than that of the axial groove portion 5W at a region other than the adjacent region.

In other words, by setting the section area of the adjacent region of the axial groove portion 5W to the opening into the circumferential main groove 2 smaller than that of the section area of the axial groove portion 5W at the region other than the adjacent region, it is possible to further improve an interference effect of the axial groove portion 5W and to promote the change from a columnar resonance of the circumferential main groove 2 to white noise.

In addition, by setting the depth of the adjacent region of the axial groove portion 5W to the opening into the circumferential main groove 2 smaller, the land portion divided by this adjacent region increases its stiffness in comparison to the land portion divided by the axial groove portion 5W at the region other than the adjacent region so as to enhance distortion resistance and driving stability.

EXAMPLE

Next, tires according to the present invention are experimentally produced and evaluated for their performance. The results will be explained below.

Figure 2:
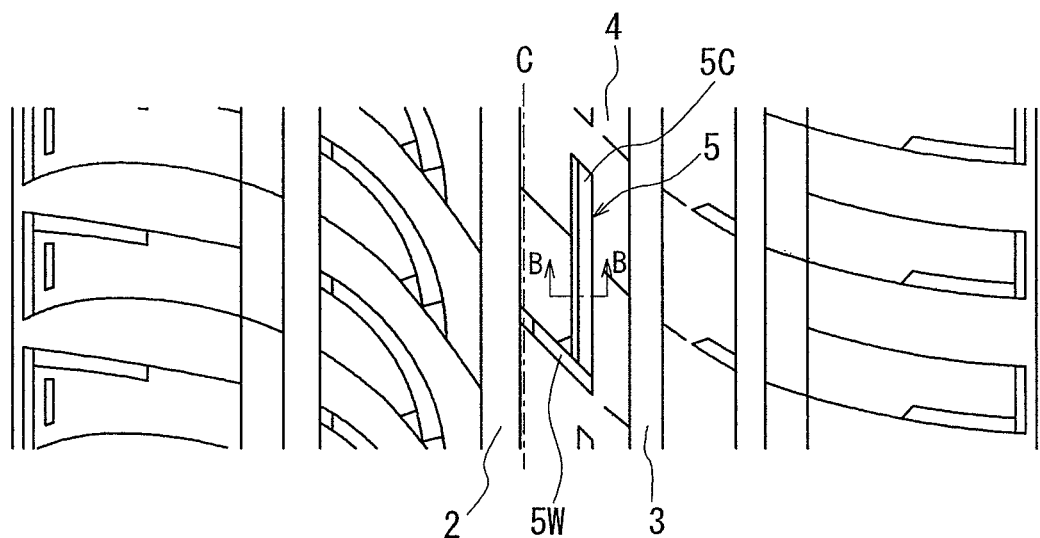
Figure 2:
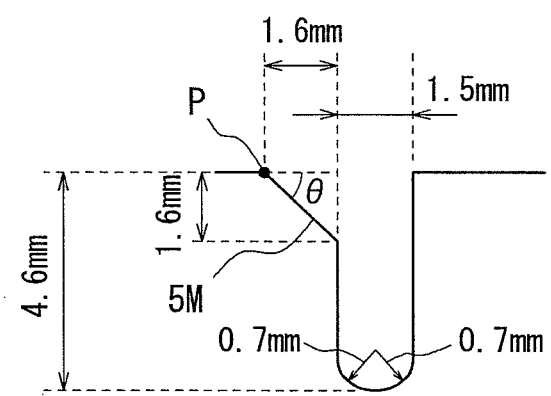

FIG. 2a shows a development view of an asymmetric tread pattern of an example tire of the present invention and FIG. 2b shows a sectional view taken along line B-B in FIG. 2a.

The example tire shown in FIG. 2a has a similar basic configuration to the tread pattern described with reference to FIG. 1a. That is to say, a tread is provided with two circumferential main grooves 2, 3, which form a pair across a tire equator C and extend along the tire equator C and a center rib 4 between the circumferential main grooves 2, 3. In addition, this center rib 4 is provided with an auxiliary groove 5 consisting of a circumferential groove portion 5C and an axial groove portion 5W in such a manner that the axial groove portion 5W is bent at an acute angle and terminates in the center rib 4.

As shown in FIG. 2b, the circumferential groove portion 5C has a tapered chamfered portion 5M inclined with respect to the surface of the tread on its groove wall in the side of the tire equator C. The inclination angle θ is 45 degrees.

The circumferential groove portion 5C of the example tire has the following dimensions; the groove width (the chamfered portion 5M is not included) is 1.5 mm, the groove depth is 4.6 mm, the width of the chamfered portion 5M is 1.6 mm, the depth of the chamfered portion 5M is 1.6 mm and the radius of curvature of the groove bottom is 0.7 mm.

Conventional Example tires A to C and Example tires A to H have a tire size of 215/60R16.

Figure 3:
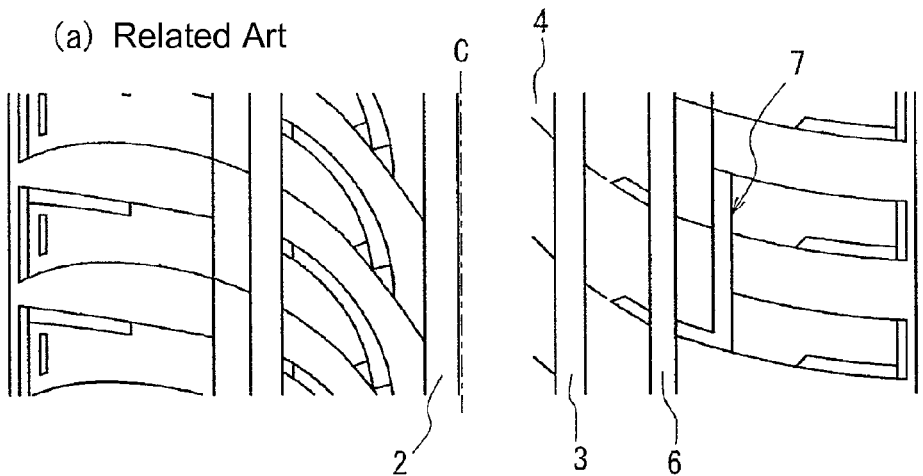
FIGS. 3a to 3c respectively show a tread pattern of Conventional Example tires A to C.
Figure 3:
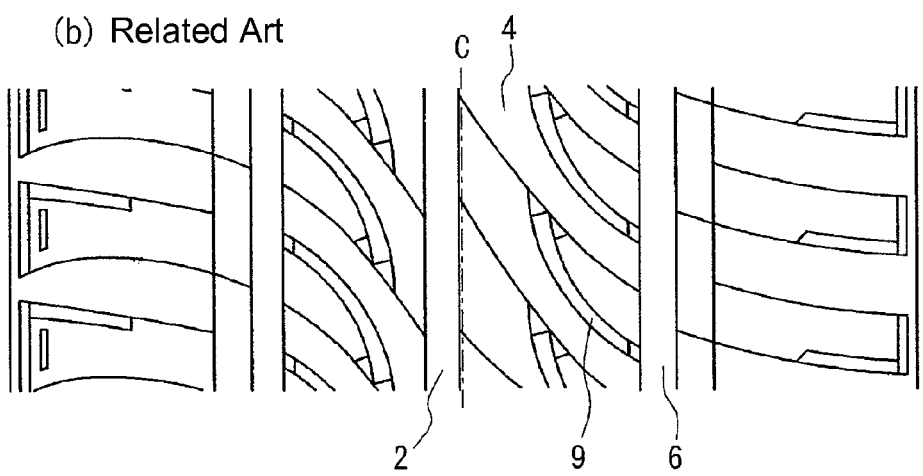
Figure 3:
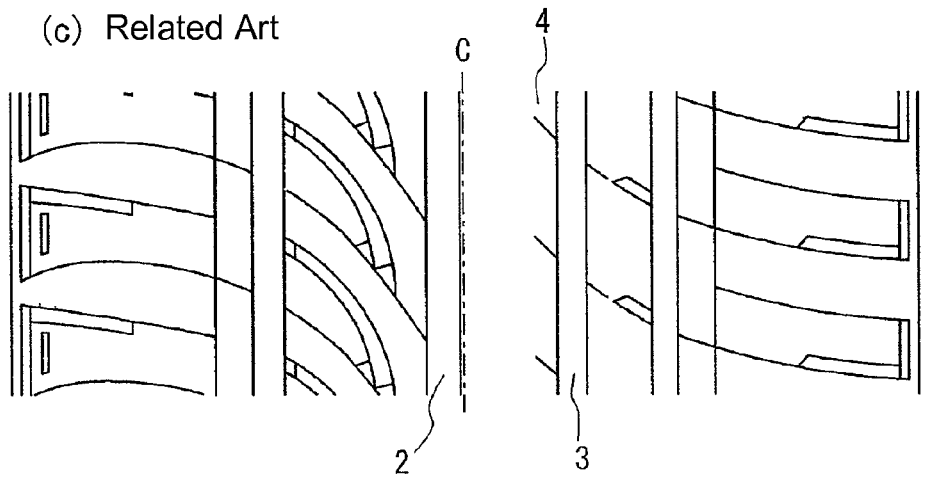

FIGS. 3a to 3c respectively show a tread pattern of Conventional Example tires A to C.

Conventional Example tire A is provided not with the auxiliary groove 5 in the center rib 4 of the example tire shown in FIG. 2a but with an auxiliary groove 7 open into the circumferential main groove 6 in a tread side as shown in FIG. 3a.

Conventional Example tire B is provided not with the circumferential main groove 3 and the auxiliary groove 5 in the center rib 4 of the example tire shown in FIG. 2a but with an auxiliary groove 9 in the center rib 4, which is open into the circumferential main groove 6 and bent at an obtuse angle as shown in FIG. 3b.

Conventional Example tire C is not provided with the auxiliary groove 5 in the center rib 4 of the example tire shown in FIG. 2a and any other additional auxiliary grooves.

Figure 4:
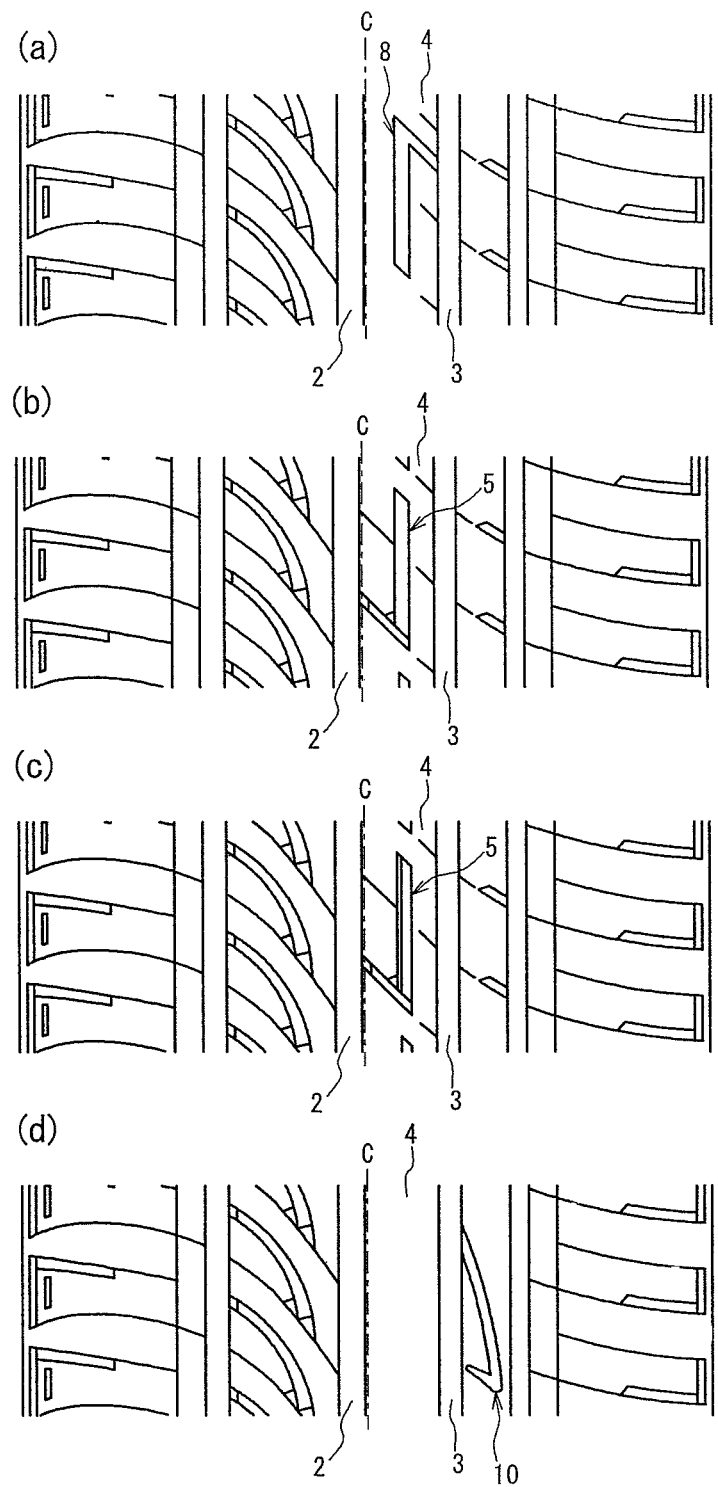
FIGS. 4a to 4c respectively show a tread pattern of Example tires A to D.
Figure 5:
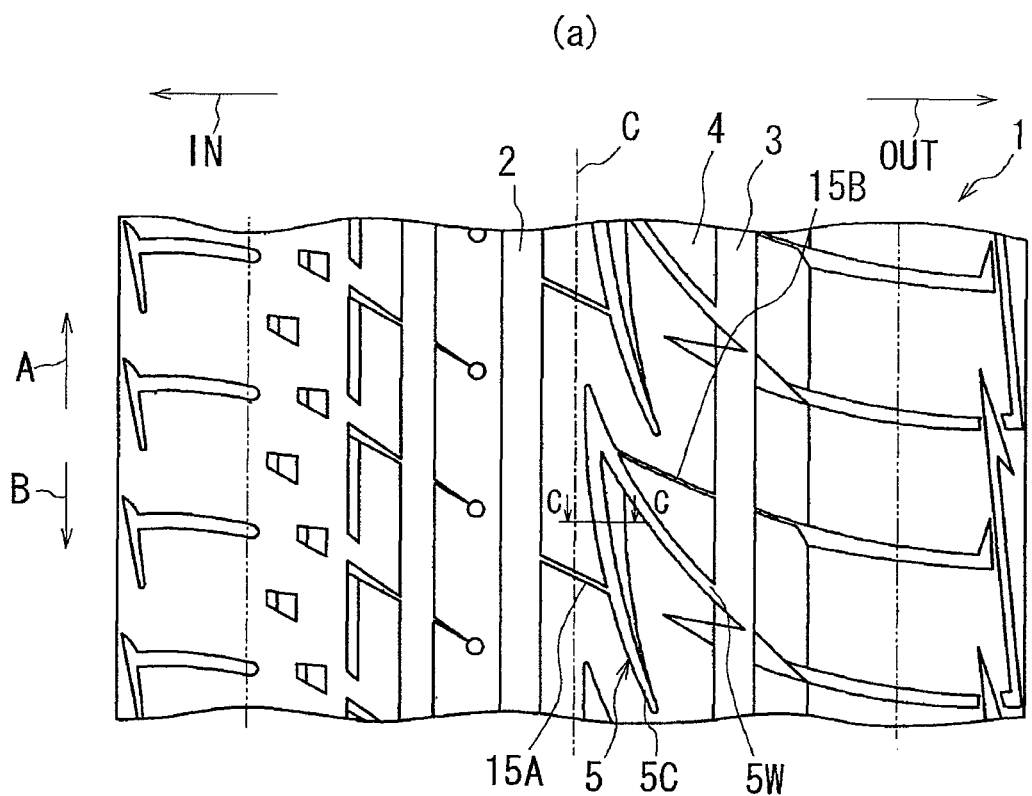
Figure 5:
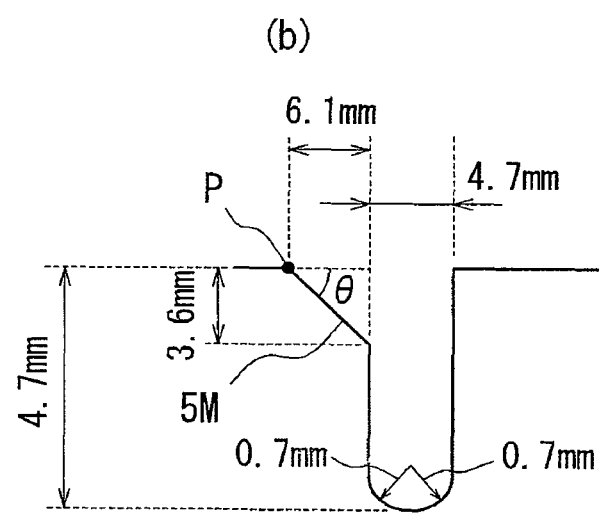
Figure 6:
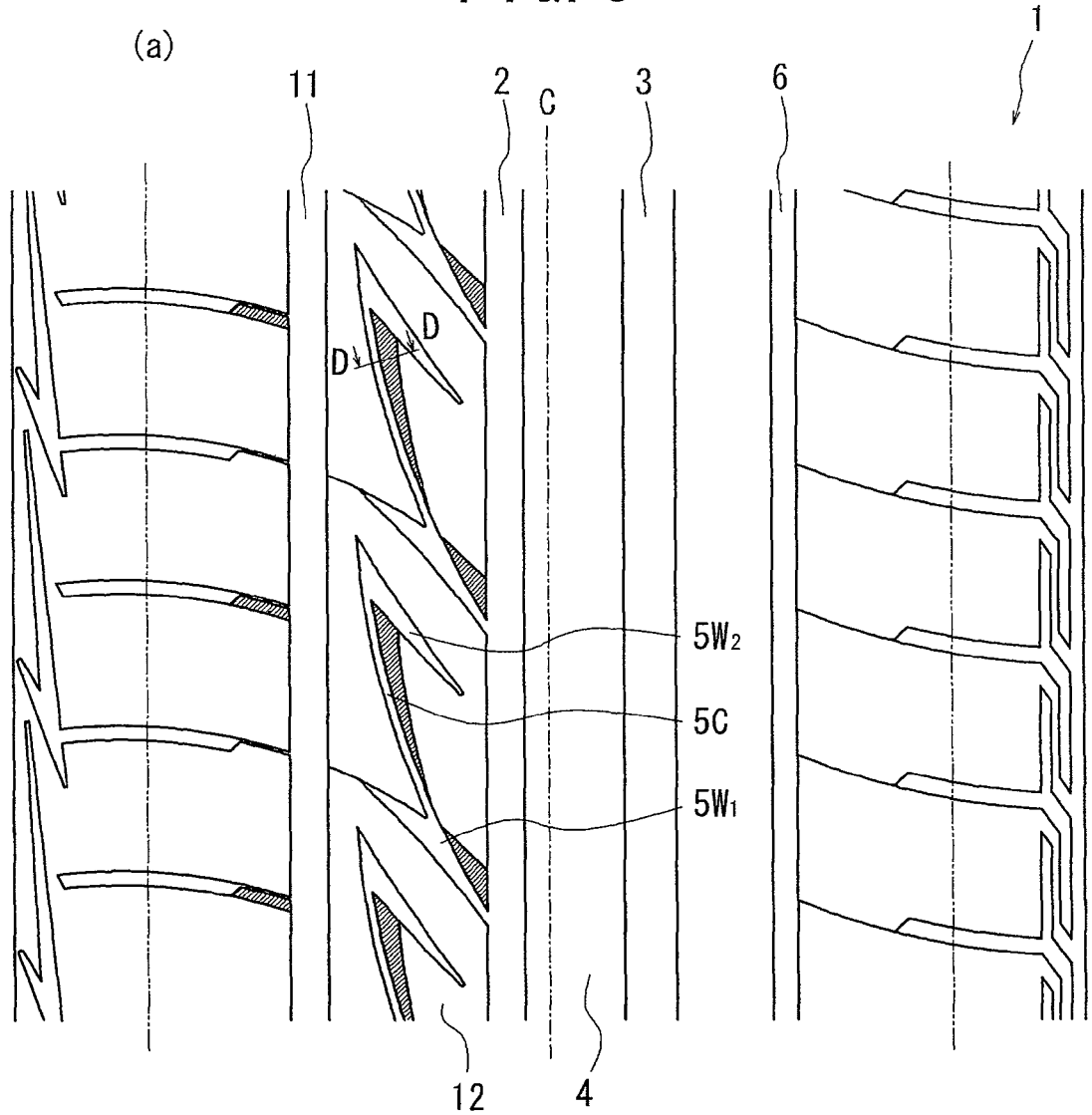
Figure 6:
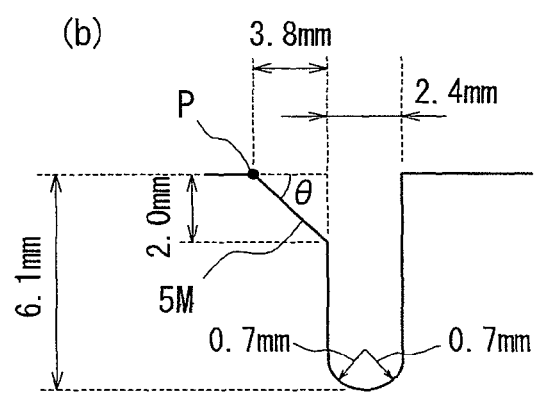
Figure 7:
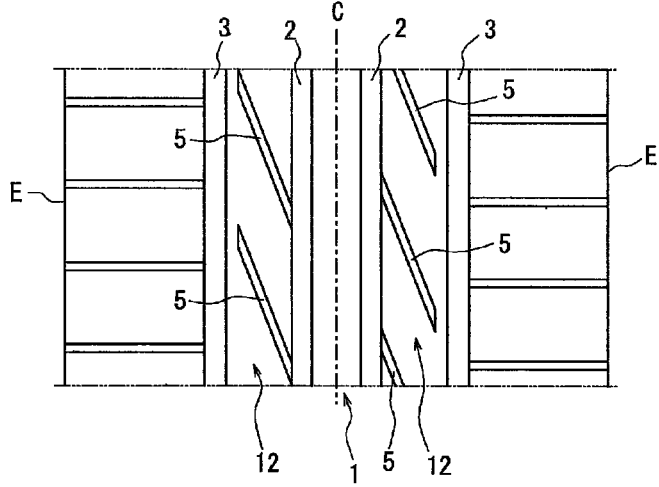
FIG. 7 shows a development view of a tread pattern of a conventional pneumatic tire.
Figure 8:
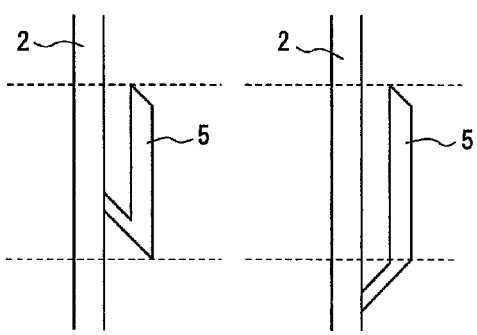
FIG. 8a shows an example in which an auxiliary groove is bent at an acute angle and FIG. 8b shows an example in which an auxiliary groove is bent at an obtuse angle.

FIGS. 4a to 4d respectively show a tread pattern of Example tires A to D, FIG. 5a shows a tread pattern of Example tire E and FIG. 6a shows a tread pattern of Example tire F.

Example tire A is provided with an auxiliary groove 8 open into the circumferential main groove 3 in the center rib 4 as shown in FIG. 4a instead of the auxiliary groove 5 of the example tire shown in FIG. 2a.

Example tire B is provided with the auxiliary groove 5 in the center rib 4 of the tread similarly to that of the example tire shown in FIG. 2a but the circumferential groove portion of auxiliary groove 5 does not have a chamfered portion.

Example tire C which is the same as the example tire shown in FIG. 2a is shown in FIG. 4c for reference. Example tire C has a chamfered portion of the auxiliary groove in such a manner that the groove wall of the circumferential groove portion of the auxiliary groove 5 of Example tire B is cut down.

All of the auxiliary grooves of Example tires A to C are extended in a linear manner.

Example tire D is provided not with the auxiliary groove 5 in the center rib 4 of the example tire shown in FIG. 2a but with an auxiliary groove 10 open into the circumferential main groove 3 as shown in FIG. 4d. The auxiliary groove 10 has a circumferential portion open into the circumferential main groove 3 and an axial portion bent at an acute angle from the circumferential portion. The bending angle is larger than that of the other Example tires. In addition, the circumferential main groove 3 is thinner than that of the other Example tires.

FIG. 5a shows a development view of an asymmetric tread pattern of Example tire E and FIG. 5b shows a sectional view taken along line C-C in FIG. 5a.

Example tire E shown in FIG. 5a is provided with two circumferential main grooves 2, 3, which form a pair across a tire equator C and extend along the tire equator C and a center rib 4 between the circumferential main grooves 2, 3. In addition, this center rib 4 is provided with auxiliary grooves 5 consisting of a circumferential groove portion 5C and an axial groove portion 5W open into the circumferential main groove 3. The auxiliary groove 5 is folded at an acute angle and terminates in the center rib 4. The circumferential main groove 2 is connected to the circumferential groove portion 5C through a sipe 15A and the circumferential main groove 3 is connected to the axial groove portion 5W through a sipe 15B.

As shown in FIG. 5b the circumferential groove portion 5C has a tapered chamfered portion 5M inclined with respect to the surface of the tread on its groove wall in the opposite side of the tire equator C. The inclination angle θ is 31 degrees. The circumferential groove portion 5C of Example tire E has the following dimensions; the groove width (the chamfered portion 5M is not included) is 4.7 mm, the groove depth is 4.7 mm, the width of the chamfered portion 5M is 6.1 mm, the depth of the chamfered portion 5M is 3.6 mm and the radius of curvature of the groove bottom is 0.7 mm.

Since a place where stone trapping is easily generated varies depending on the combination of a groove width, a groove depth and curvature of the circumferential groove portion 5C, a location where the chamfered portion 5M is provided in the circumferential groove portion 5C may be determined according to this place where stone trapping is easily generated.

FIG. 6a shows a development view of an asymmetric tread pattern of Example tire F and FIG. 6b shows a sectional view taken along line D-D in FIG. 6a.

Example tire F shown in FIG. 6a is provided with a rib 12 between two circumferential main grooves 2, 11, which form a pair across a tire equator C and extend along the tire equator C and an auxiliary groove 5 consisting of a circumferential groove portion 5C and two axial groove portions $5W_1$, $5W_2$ in the rib 12. The auxiliary groove 5 is folded at an acute angle and terminates in the rib 12. The circumferential main groove 2 is connected to the axial groove portion $5W_1$, the axial groove portion $5W_1$ is connected to the circumferential groove portion 5C and the circumferential groove portion 5C is bent and folded at an acute angle to be connected to the axial groove portion $5W_2$.

As shown in FIG. 6b, the circumferential groove portion 5C has a tapered chamfered portion 5M inclined with respect to the surface of the tread on its groove wall in the side of the tire equator C. The inclination angle θ is 28 degrees. The circumferential groove portion 5C of Example tire F has the following dimensions; the groove width (the chamfered portion 5M is not included) is 2.4 mm, the groove depth is 6.1 mm, the width of the chamfered portion 5M is 3.8 mm, the depth of the chamfered portion 5M is 2.0 mm and the radius of curvature of the groove bottom is 0.7 mm.

In addition, Example tire G which is the same as Example tire E except that the chamfered portion is not provided and Example tire H which is the same as Example tire F except that the chamfered portion is not provided are produced.

Each of Conventional Example tires A to C and Example tires A to H is mounted on a rim having oblateness of 55 and 16×7J and then the tire/rim assembly is attached to 4 wheels of a passenger car as front and rear wheels. The tire internal pressure of 220 kPa is applied to the front and rear wheels. The load corresponding to two passengers is applied.

Each of Conventional Example tires A to C and Example tires A to H is evaluated with regard to driving stability, drainage performance, change of a columnar resonance to white noise and stone strapping resistance.

<Measurement of Driving Stability>

A vehicle having the above-mentioned condition is driven on a test course having a circling road including a long straight stretch and a handling evaluation road with many gentle curves at from a low speed to a speed of about 150 km/h and driving stability (handle responsiveness) is evaluated on the basis of the driver's feelings, with 10 points being full score. Driving stability is indexed with the value of Example tire A being defined as 0 and the results are shown in Table 2.

The result of only Conventional Example tire C is +1, which may be because there is no auxiliary groove in the center rib 4. Other Conventional Example tires and Example tires A to D show the same results. As for driving stability, the results of all of Example tires show that good driving stability is maintained.

<Measurement of Drainage Performance>

A vehicle having the above-mentioned condition is driven while accelerating on a straight road in water that is 10 mm depth and a speed when hydroplaning is generated is measured. The hydroplaning speed is defined in the following method. The running distance is measured with using a fifth wheel and the measurement results are plotted with revolutions per minute. The speed corresponding to the revolutions per minute when an inclination is suddenly changed is defined as speed of hydroplaning generation. The speed of hydroplaning generation is measured three times and the average value is defined as average generation speed. This average generation speed is indexed with the value of Example tire A being defined as 100 and drainage performance is evaluated. The results are shown in Table 2.

Conventional Example tires B and C not having an auxiliary groove bent at an acute angle in the center rib 4 show bad results. Although Example tire D does not show its results in Table 2, it shows better results than those of Conventional Example tire C. As for drainage performance, all of Example tires show the results of not less than index of 99, which are equal or better than those of Conventional Example tires.

<Measurement of Change of a Columnar Resonance to White Noise>

Change of a columnar resonance to white noise is evaluated on the basis of the driver's feelings under the same condition as that of the above-mentioned driving stability. When there is a difference of not less than 1 in evaluation results, it means significantly different.

As for the change of a columnar resonance to white noise, the tires having the auxiliary groove open into the circumferential main groove in the tread central portion show good results. Although Example tire D does not show its results in Table 2, it shows better results than those of Conventional Example tire C. All of Example tires show not less than 1.6, which means improved results and significantly different from the results of Conventional Example tires except for Conventional Example tire B.

<Measurement of Stone Strapping Resistance>

A vehicle having the above-mentioned condition is driven in stone trapping mode and subsequent stone releasing mode and then the number of stones left in Conventional Example tires A to C and Example tires A to H are measured. Conditions of running in stone trapping mode and running in stone releasing mode are shown in Table 1 and their results are shown in Tables 2 and 3. The weather is fine and the temperature is 12 degrees C.

TABLE 1

|  | Running in stone trapping mode | Running in stone releasing mode |
|---|---|---|
| Location | Durable gravel road | Durable circular road |
| Running distance | about 1 km | about 2 km |
| Speed | 20 km/h (constant) | 20→70→80→20 km/h (even running) |
| Steering force | Nearly zero | Slalom corresponding 0.23G |

TABLE 2

|  | Reference FIG. | Driving stability | Drainage performance | Change of a columnar resonance to white noise | Number of stone left (sum of four wheels) | | | |
|---|---|---|---|---|---|---|---|---|
|  |  |  |  |  | small | medium | large | sum |
| Conventional Example tire A | FIG. 3a | ±0 | 99 | +1.0 | 2 | 40 | 0 | 42 |
| Conventional Example tire B | FIG. 3b | ±0 | 95 | +2.0 | 2 | 46 | 5 | 53 |
| Conventional Example tire C | FIG. 3c | +1 | 95 | −2.0 | 2 | 38 | 0 | 40 |
| Example tire A | FIG. 4a | ±0 | 100 | +1.6 | 2 | 49 | 4 | 55 |
| Example tire B | FIG. 4b | ±0 | 99 | +2.0 | 2 | 48 | 4 | 54 |
| Example tire C | FIG. 4c | ±0 | 103 | +2.0 | 2 | 38 | 0 | 40 |

TABLE 3

|  | Reference FIG. | Number of stone left (sum of four wheels) | | | |
|---|---|---|---|---|---|
|  |  | small | medium | large | sum |
| Example tire E | FIG. 5a | 2 | 35 | 0 | 37 |
| Example tire F | FIG. 6a | 2 | 38 | 0 | 40 |
| Example tire G | — | 2 | 48 | 4 | 54 |
| Example tire H | — | 2 | 50 | 5 | 57 |

In Tables 2 and 3 "small" means that the diameter of a stone is less than 5 mm, "medium" means that the diameter thereof is not less than 5 mm and less than 10 mm and "large" means that the diameter thereof is not less than 10 mm.

As for stone strapping resistance, Example tire C having a chamfered portion shows improved results in stone strapping resistance in comparison to those of Conventional Example tires A to C and the other Example tires.

Example tires E, F having a chamfered portion show improved results in medium and large stone strapping resistance in comparison to those of Example tires G, H.

Although improvement in stone trapping resistance is seen in a tire having other oblateness size, the effect of the present invention is remarkable especially in Comparative Example tire G, H, which does not have a chamfered portion and has oblateness of not more than 55 since a lot of stones are trapped.

As stated above, the present invention can provide a pneumatic tire capable of keeping driving stability well, changing a columnar resonance generated in the circumferential main groove to white noise to reduce the columnar resonance and improving drainage performance and stone strapping resistance.

The invention claimed is:

1. A pneumatic tire comprising a tread provided with at least two circumferential main grooves and a rib defined in a tread central portion by two of the circumferential main grooves, wherein
    an auxiliary groove is formed in the tread central portion, the auxiliary groove having a circumferential groove portion extending in a tire equator direction and an axial groove portion extending from an end of the circumferential groove portion in such a manner that the axial groove portion is bent at an acute angle to the circumferential groove portion, and
    at least an end of the auxiliary groove is open into one of the two circumferential main grooves,
    wherein the rib is located on the tire equator,
    wherein the circumferential groove portion of the auxiliary groove has a chamfered portion inclined with respect to a surface of the tread on at least one groove wall of both groove walls sectioning the circumferential groove portion,
    wherein the chamfered portion is formed on one groove wall of the circumferential groove portion only in a side of the axial groove portion,
    wherein the width of the chamfered portion gradually decreases from the axial groove portion side end of the circumferential groove portion to a terminated end of the circumferential groove portion,
    wherein the acute angle is formed between the circumferential groove portion and the axial groove portion,
    wherein the chamfered portion is provided only in a half tread portion on one side of the tire equator, and
    wherein the other half tread portion on the other side of the tire equator is not provided with an auxiliary groove having a chamfered circumferential groove portion extending in a tire equator direction and an axial groove portion extending from an end of the chamfered circumferential groove portion in such a manner that the axial groove portion is bent at an acute angle to the chamfered circumferential groove portion.

2. The pneumatic tire according to claim 1, wherein the chamfered portion formed on one groove wall of the circumferential groove portion of the auxiliary groove has an inclination angle within a range between 30 degrees and 60 degrees with respect to the surface of the tread.

3. The pneumatic tire according to claim 1, wherein the chamfered portion is formed on one groove wall of the circumferential groove portion in a side of the axial groove portion and has a depth of 10% to 60% of that of the circumferential groove portion.

4. The pneumatic tire according to claim 1, wherein
    a length of the circumferential groove portion of the auxiliary groove measured along its longitudinal direction is longer than that of the axial groove portion of the auxiliary groove measured along its longitudinal direction.

5. The pneumatic tire according to claim 1, wherein a depth of the circumferential groove portion of the auxiliary groove is smaller than that of the axial groove portion of the auxiliary groove.

6. The pneumatic tire according to claim 1, wherein a depth of the axial groove portion of the auxiliary groove at a region adjacent to an opening into the circumferential main groove is smaller than that of the axial groove portion at a region other than the adjacent region.

7. The pneumatic tire according to claim 1, wherein an entire length of a single auxiliary groove obtained by adding the length of the circumferential groove portion and the length of the axial groove portion is within a range of 40% to 60% of a ground contact length of the tread.

8. The pneumatic tire according to claim 1, wherein the circumferential groove portion is connected to the other of the two of the circumferential main grooves through a sipe, and the axial groove portion is connected to the one of the two of the circumferential main grooves through another sipe.

\* \* \* \* \*